US008621482B1

United States Patent
Ramesh et al.

(10) Patent No.: US 8,621,482 B1
(45) Date of Patent: Dec. 31, 2013

(54) DECIDING WHETHER TO CACHE A GENERIC PLAN FOR EXECUTING A REQUEST BASED ON A SYSTEM PERFORMANCE METRIC

(75) Inventors: Bhashyam Ramesh, Secunderabad (IN); Donald Pederson, San Diego, CA (US); Manjula Koppuravuri, Secunderabad (IN)

(73) Assignee: Teradata US, Inc., Dayton, OH (US)

( * ) Notice: Subject to any disclaimer, the term of this patent is extended or adjusted under 35 U.S.C. 154(b) by 1061 days.

(21) Appl. No.: 12/205,380

(22) Filed: Sep. 5, 2008

(51) Int. Cl.
*G06F 9/46* (2006.01)
*G06F 7/00* (2006.01)

(52) U.S. Cl.
USPC .............................. 718/106; 718/102; 707/2

(58) Field of Classification Search
None
See application file for complete search history.

(56) References Cited

U.S. PATENT DOCUMENTS

| | | | |
|---|---|---|---|
| 2005/0060285 A1* | 3/2005 | Barsness et al. | 707/2 |
| 2008/0215535 A1* | 9/2008 | Day et al. | 707/2 |
| 2009/0100004 A1* | 4/2009 | Andrei et al. | 707/2 |

* cited by examiner

*Primary Examiner* — Kenneth Tang
(74) *Attorney, Agent, or Firm* — Howard Speight; Ramin Mahboubian

(57) ABSTRACT

A method, computer program, and database system are disclosed. A plurality of instances of a request to a database system are received. All instances of the request have a same set of variables to use in executing the request. The values of the variables are supplied by data in a data source. A specific plan for executing one instance of the request is generated. Generating the specific plan includes taking into account data in the data source. The specific plan is executed on the database system. A system run-time metric and a parsing time for executing the specific plan are captured and saved. A generic plan is generated and cached based on a comparison of the system run-time metric and the parsing time for executing the specific plan.

20 Claims, 5 Drawing Sheets

DECIDING WHETHER TO CACHE A GENERIC PLAN FOR EXECUTING A REQUEST BASED ON A SYSTEM PERFORMANCE METRIC

BACKGROUND

Database management systems accept requests, a term that encompasses utilities and queries, and execute them. Often, more than one path for executing the request is available. One component of the database management system, the optimizer, identifies the available paths and works to choose the path that best satisfies constraints that have imposed on the system and its performance.

SUMMARY

In general, in one aspect, the invention features a method including receiving a plurality of instances of a request to a database system. All instances of the request have a same set of variables to use in executing the request. The value of the variables are supplied by data in a data source. The method includes generating a specific plan for executing one instance of the request. Generating the specific plan includes taking into account data in the data source. The method includes executing the specific plan on the database system. The method includes capturing and saving a system run-time metric and a parsing time for executing the specific plan. The method includes deciding to generate and cache a generic plan based on a comparison of the system run-time metric and the parsing time for executing the specific plan.

Implementations of the invention may include one more of the following. The method may include using the cached generic plan to execute instances of the request received after the generic plan is cached. The plurality of instances of the request may include a first instance, which may be the first in time of the instances to be received by the database system. The plurality of instances of the request may include a second instance, which may be the second in time of the instances to be received by the database system. Deciding may occur after receipt of the first instance of the request and before receipt of the second instance of the request. The specific plan may be generated for the first instance of the request. Deciding may include determining that the parsing time for executing the specific plan is not a small fraction of the system run-time metric for executing the specific plan. In response, the method may include generating a generic plan for executing the second instance of the request and estimating a system run-time metric for executing the generic plan. Generating the generic plan may include not taking into account data in the data source. The method may include determining that the estimate of the system run-time metric for executing the generic plan is not much greater than the estimate of the system run-time metric for executing the specific plan. In response, the method may include executing the generic plan. The plurality of instances of the request may include a third instance, which is the third in time of the instances to be received by the database system. Deciding may occur after receipt of the second instance of the request. The specific plan may be generated for the first instance of the request. Deciding may include generating a generic plan for executing the second instance of the request, executing the generic plan on the database system, capturing and saving a system run-time metric and a parsing time for executing the generic plan, and basing the decision to cache the generic plan on a comparison of a fraction of the parsing cost to the difference between the system run-time metric for executing the generic plan and the system run-time metric for executing the specific plan. Deciding may include determining that an instance of the request is a special request selected from the group consisting of a high priority request, a tactical request, a request comprising a temporal element, and a request that will invoke a single computer out of a plurality of computer running the database system.

In general, in another aspect, the invention features a computer program stored in a tangible medium. The program includes executable instructions that cause a computer to receive a plurality of instances of a request to a database system. All instances of the request have a same set of variables to use in executing the request. The values of the variables are supplied by data in a data source. The program includes executable instructions that cause a computer to generate a specific plan for executing one instance of the request. When generating the specific plan the computer takes into account data in the data source. The program includes executable instructions that cause a computer to execute the specific plan on the database system. The program includes executable instructions that cause a computer to capture and save a system run-time metric and a parsing time for executing the specific plan. The program includes executable instructions that cause a computer to decide to generate and cache a generic plan based on a comparison of the system run-time metric and the parsing time for executing the specific plan.

In general, in another aspect, the invention features a database system. The database system includes one or more nodes. The database system further includes a plurality of CPUs, each of the one or more nodes providing access to one or more CPUs. The database system further includes a plurality of virtual processes, each of the one or more CPUs providing access to one or more virtual processes. The database system further includes each virtual process configured to manage data, including rows from the set of database table rows, stored in one of a plurality of data-storage facilities. The database system further includes a program. The program is configured to receive a plurality of instances of a request to a database system, all instances of the request having a same set of variables to use in executing the request, the value of the variables being supplied by data in a data source. The program is further configured to generate a specific plan for executing one instance of the request, wherein when generating the specific plan the computer takes into account data in the data source. The program is further configured to execute the specific plan on the database system. The program is further configured to capture and save a system run-time metric and a parsing time for executing the specific plan. The program is further configured to decide to generate and cache a generic plan based on a comparison of the system run-time metric and the parsing time for executing the specific plan.

DETAILED DESCRIPTION

Figure 1:
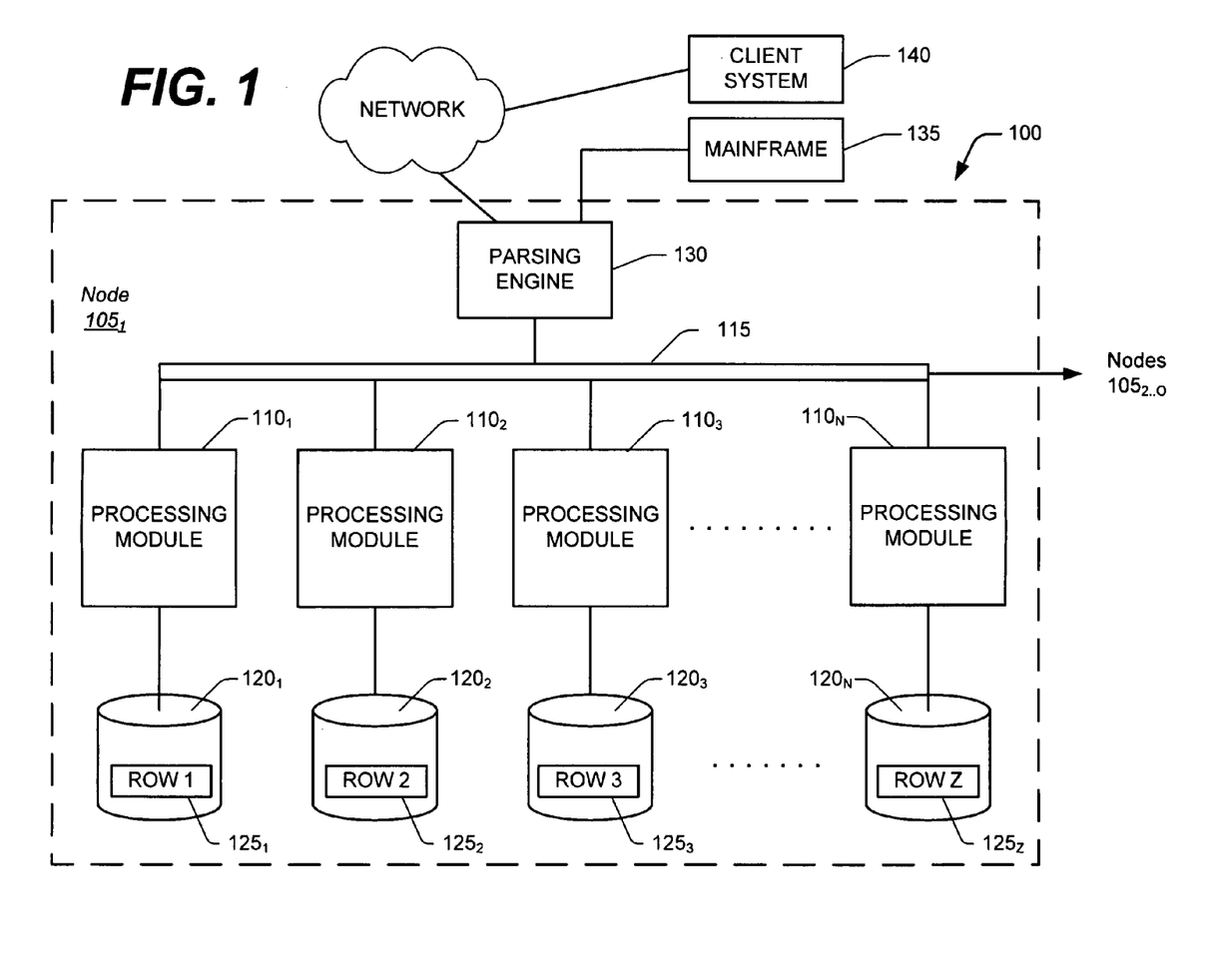
FIG. 1 is a block diagram of a node of a parallel processing database system.

The technique for deciding whether to cache a generic plan for executing a request based on a system performance metric disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
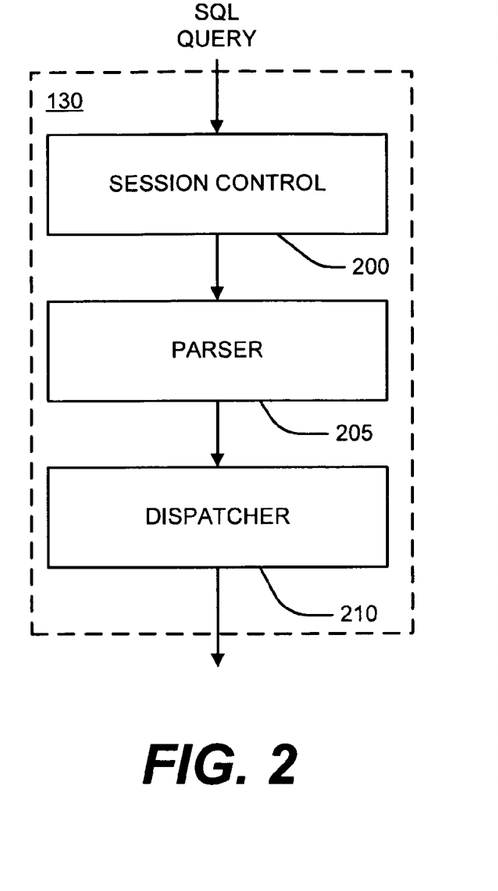
FIG. 2 is a block diagram of a parsing engine.

In an example system, the parsing engine 130 is made up of three components: a session control 200, a parser 205, and a dispatcher 210, as shown in FIG. 2. Session control 200 provides a logon and logoff function. It accepts a request for authorization to access the database, verifies it, and then either allows or disallows the access.

Figure 3:
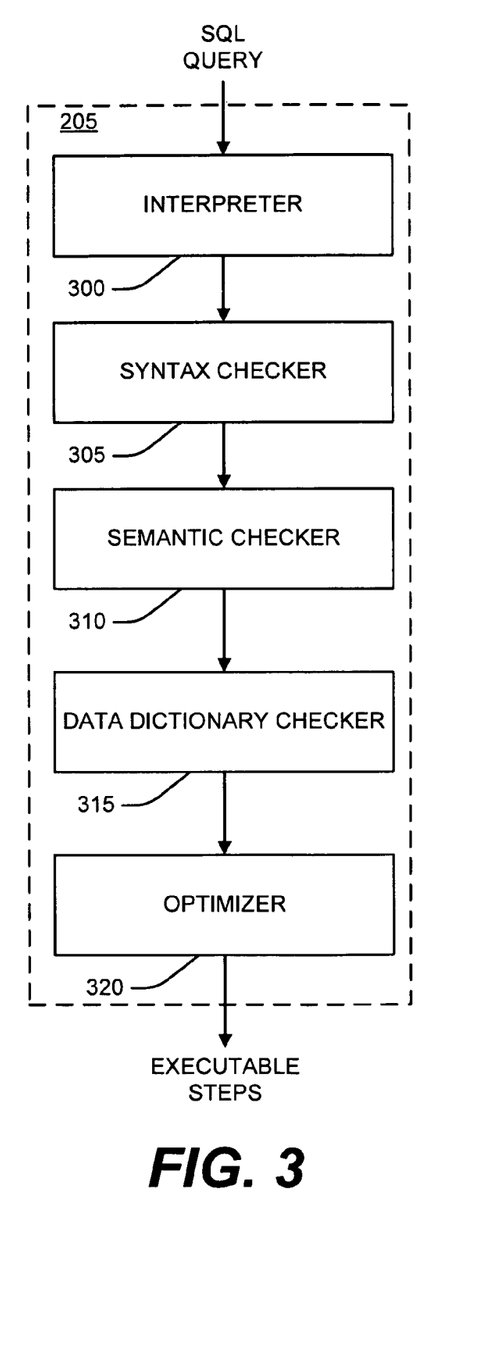
FIG. 3 is a block diagram of a parser.
Figure 4:
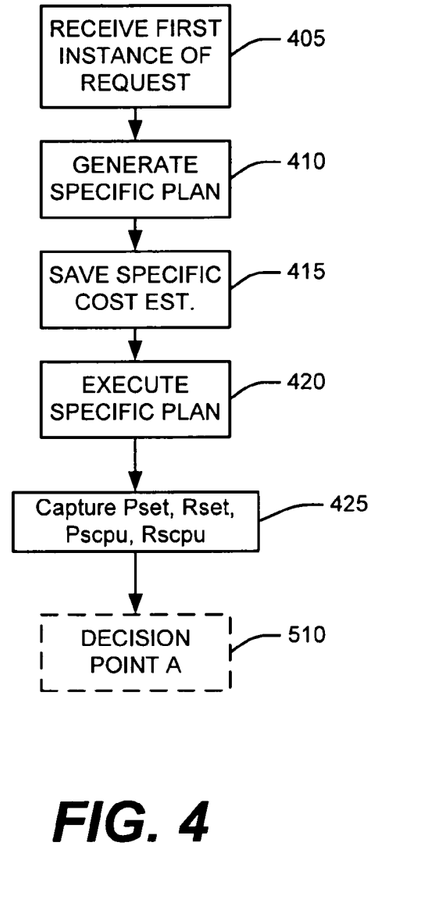
FIGS. 4-8 are flow charts illustrating one embodiment of a method for deciding whether to cache a generic plan for executing a request based on a system performance metric.
Figure 5:
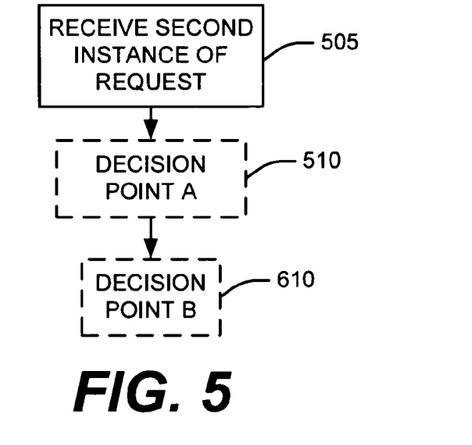
Figure 6:
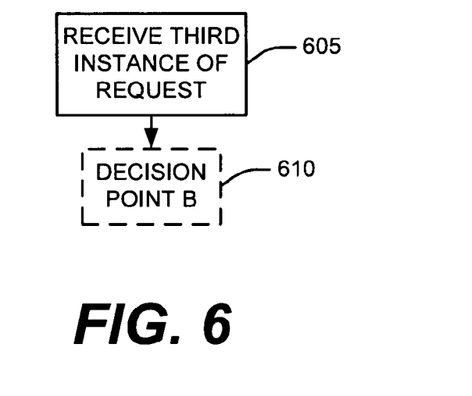
Figure 7:
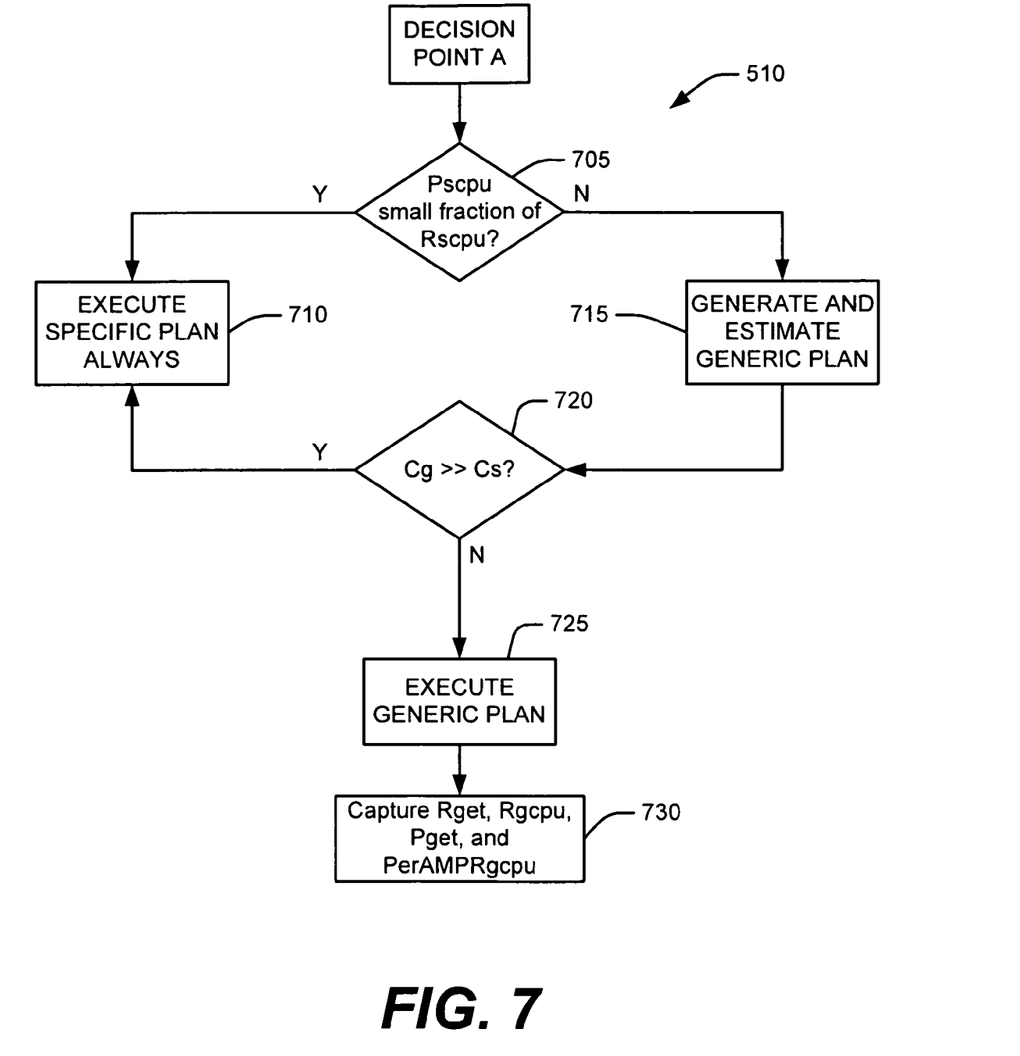

Once session control 200 allows a session to begin, a user may submit a SQL request, which is routed to parser 205. As illustrated in FIG. 3, parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops, for example, the least expensive plan to perform the request.

The Teradata Relational Database Management System (RDBMS) allows a request to be modified by a "USING" request modifier, which defines one or more variable parameter names used to import data to or export data from the Teradata RDBMS. A separate command, such as an "IMPORT" command, defines the source, if data is imported, or target, if data is exported.

For example, assume that a client system wishes the RDBMS to perform the following query for a number of values of X:
SELECT*FROM t1
WHERE t1.a=X;
One example way to do this is to create a table, source.dat, on the client system as shown below:
source.data
4
8
15
The following command and query would then be sent by the client system to the RDBMS:
IMPORT DATA FILE=c:\temp\source.dat
USING (X integer)
SELECT*FROM t1
WHERE t1.a=:X;
The IMPORT statement opens the file to provide data, the USING statement identifies the variable (X) that is to be imported from the file, and the SELECT statement has been modified by adding a colon (":") before the "X" in the predicate to identify where in the SELECT statement the imported is to be inserted. This combination of command and query would have the effect of running the query three times, once with X having the value 4, once with X having the value 8, and once with X having the value 15, as shown below:
SELECT*FROM t1
WHERE t1.a=4;
SELECT*FROM t1
WHERE t1.a=8;
SELECT*FROM t1
WHERE t1.a=15;
This same set of commands can be used to execute the same query with a different set of input parameters by changing the source file to, for example, source_new.dat, as shown below:
IMPORT DATA FILE=c:\temp\source_new.dat
USING (X integer)
SELECT*FROM t1
WHERE t1.a=:X;
In the example above, the query and source file are very simple. The same technique can be used for much more complex queries and much more complex source files. Similarly, the same technique can be used with database utilities, such as LOAD or UNLOAD, and a target file can be substituted for the source file. Further, the source data can be sent with the request rather than opening a file on a client system. A parameterized request, using, for example, a parameter marker such as a question mark can be used instead of the ":" nomenclature described above. For example, a parameterized version of the above request would be:
SELECT*FROM t1
WHERE t1.a=?;
The parameter marker is bound to an application variable. To execute this parameterized request, the application sets the value of the variable and executes the statement.

It is sometimes useful for client systems to submit the same command and request with USING modifier over and over again. In some cases, a client may find it useful to save a very complex query with a USING modifier and periodically submit it to the RDBMS along with, for example, a complex source file with the contents of the source file changing with every submission.

It is possible, as a result, that an RDBMS will see the same command/request set over and over again.

In one embodiment, the optimizer 320 has two options upon receiving such a command/request set: it can generate a generic plan or it can generate a specific plan. When generating a generic plan the optimizer 320 does not take into account the data in the source file identified in the command. Since a generic plan is not dependent on the data in the source file, it can be used any time the command/request set is received and it makes sense to cache it. When generating a specific plan, on the other hand, the optimizer 320 does take into account the data in the source file. Because a specific plan depends on the data in the source file and would not be used with a different source file, and because the command/query sets described above typically use different source files when they are resubmitted, it is not efficient to cache specific plans.

A specific plan will likely execute more efficiently for the command/query set but it will likely be more costly (i.e., require more CPU or I/O time, or the like) to generate. Thus, the decision on whether to generate and cache a generic plan for the command/query set described above can be challenging.

Typically, optimizer decisions are based on cost, with the cost of each choice typically being related to the amount of system resources (e.g., CPU, I/O, memory, disk space, etc.) consumed by that choice. The cost of generating and executing a plan (generic or specific) for executing a request can be broken down into the cost to parse the request (referred to herein as parsing time) and some or all of the cost to execute the request (such as, for example, CPU time, I/O consumed, memory consumed, etc. or some combination of those factors; referred to hereinafter as a system run-time metric).

Typically, the parsing time is the same for both a generic plan and a specific plan because the same request is being parsed in both cases. If a cached generic plan is costed, however, the parsing has already been done and the parsing cost is eliminated from the calculation for the generic plan's cost.

Typically, the system run-time metric for a specific plan will be less than that for a generic plan.

In one embodiment, under some circumstances, high priority requests, tactical requests, and requests that can be run against a single AMP are more efficiently executed with generic plans.

In one embodiment, the basic approach is to take into account actual run time environment specifics by comparing the system run-time metric and actual elapsed time values of a generic plan and a specific plan. The comparison can determine the extent to which data values influence a plan or can produce a plan which is more optimal. Furthermore, a comparison can be used to determine whether run time benefits exceed optimization costs. These two factors can be used to determine whether a plan is suitable for caching and whether to pursue a specific plan or a generic plan.

At a high level, as illustrated in FIGS. 4-8, one embodiment of the algorithm is as follows (see list of abbreviations below):

Upon receiving the request the first time (block 405)
{
   Generate (and estimate the cost of) a specific plan (block 410)
   Save specific plan cost estimate (Cs) (block 415)
   Execute specific plan (block 420) (the specific plan is executed for the first receipt of the request to provide an optimal plan for those requests that are submitted only once)
   Capture specific plan system run-time metric (e.g., Rscpu), specific plan elapsed time (Rset), parsing time (Pset), and Pscpu (block 425)
}
If request is seen a second time (block 505)
{ (block 510, Decision Point A; this element can optionally take place at the end of processing the receipt of first instance of request (after block 425))
   If Pscpu is a small fraction (in one embodiment less than 1 percent; in one embodiment less than 5 percent; in one embodiment less than 10 percent) of Rscpu (block 705)
   {
      Execute specific plan always (block 710) (thus, if the parsing cost of the specific plan, Pscpu, is a small fraction of its system run-time metric, Rscpu, the overhead of parsing is small; the impact of not caching the request is not significant, and all subsequent requests execute specific plans)
   }
   Else
   {
      Generate and estimate a generic plan (Cg) (block 715)
      If the estimate of the generic plan cost (Cg) far far exceeds (in one embodiment exceeds by a factor of 5; in one embodiment exceeds by a factor of 10; in one embodiment exceeds by a factor of 20) the estimate of a specific plan cost (Cs) (block 720)
      {
         Reoptimize and execute specific plan always (block 715) (this avoids the execution of a bad generic plan when a good specific plan is available)
      }
      Else
      {
         Execute the generic plan (block 725)
         Capture generic plan system run-time metric (e.g., Rgcpu), generic plan elapsed time (Rget), PerAMPRgcpu, and parsing CPU time (Pget) (capturing Pget is optional because the generic plan parsing time should be the same as the specific plan parsing time) (block 730)
      }
   }
}
If request is seen a third or subsequent time (block 605)
{ (block 610 - Decision Point B; note that this element can optionally take place at end of processing receipt of second instance of request (after block 510))
   If the decision has not already been made to execute the specific plan always and therefore to not cache the generic plan or to always use a cached generic plan (in one embodiment the generic/specific decision can be revisited, for example each time the request is subsequently received; for example, if the original decision was specific any future degradation of specific plan performance may indicate optimizer bugs or a change in the state of system resources and the decision can be altered to generic (block 805)
   {
      If the request is a HiPriority and (Pset + Rset) > Rget * ElapsedTimeThreshold (in one embodiment 10 percent; in one embodiment 20 percent; in one embodiment 30 percent) (block 810)
      {
         Generic plan is better and therefore cache it for future requests (block 815)
      }
      Else
      {
         If the query is a tactical query determined by

Figure 8:
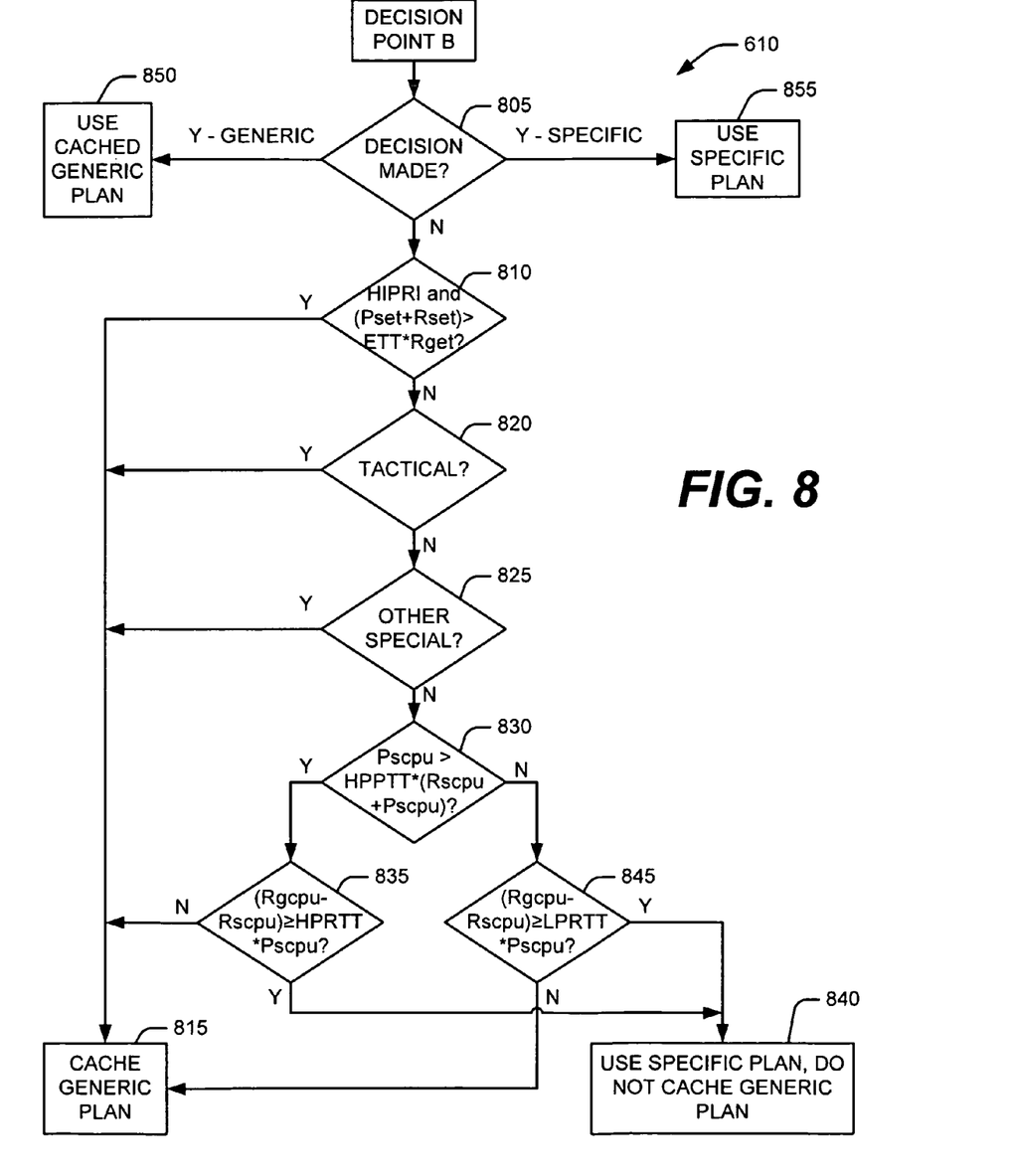

```
    its low CPU consumption per AMP (in one
    embodiment less than 1 CPU-second per AMP; in one
    embodiment less than 2 CPU-seconds per AMP; in
    one embodiment less than 3 CPU-seconds per AMP;
    this amount will decrease as AMP speeds increase)
    {
        Generic plan is better and therefore cache
        it for future requests (block 815)
    }
    Otherwise /* query is not tactical and is not
    hipriority (note that at this point it may be
    useful to evaluate other special conditions
    (block 825)*/
    {
        If Pscpu > (Rscpu + Pscpu) *
        HighParsingPTThreshold (in one embodiment
        10 percent; in one embodiment 20 percent;
        in one embodiment 30 percent) (block 830)
        {
            If (Rgcpu – Rscpu) >= Pscpu *
            HighParsingRTThreshold (in one
            embodiment 10 percent; in one
            embodiment 20 percent; in one
            embodiment 30 percent) (block 835)
            {
                Generate specific plan and do
                not cache (block 840)
            }
            Else
            {
                Generic plan is better and
                therefore cache it for future
                requests (block 815)
            }
        }
        Otherwise /* Parsing is not that high */
        {
            If (Rgcpu – Rscpu) >= Pscpu *
            LowParsingRTThreshold (in one
            embodiment 10 percent; in one
            embodiment 5 percent; in one
            embodiment 1 percent) (block 845)
            {
                Then Generate specific plan and
                do not cache (block 840)
            }
            Else
            {
                Generic plan is better and
                therefore cache it for future
                requests (block 815)
            }
        }
    }
}
Else (decision made - Y (block 805)
    If the decision was to use a cached generic plan, then use
    the cached generic plan (block 850)
    Else use a specific plan (block 855).
```

As mentioned above, other special circumstances may warrant not caching a generic plan (block 825). An example of such a special circumstance would be when the request includes a temporal element, such as CURRENT_DATE. In that circumstance, in one embodiment, since CURRENT_DATE may be different each time the request is received, it may not make sense to cache a generic plan. Instead a specific plan will always be used for such requests.

One embodiment of a specific algorithm is as shown below. The following abbreviations are used in the preceding high-level algorithm description and in the specific algorithm description set out below:

Cs—represents the specific plan cost estimate.

Cg—represents the generic plan cost estimate.

Pset—represents the elapsed time for parsing a request for the specific plan.

Pget—represents the elapsed time for parsing a request for the generic plan.

Rset—represents the AMP elapsed time for the specific plan.

Rget—represents the AMP elapsed time for the generic plan.

Pscpu—represents the CPU path time for parsing a request for the specific plan.

Rscpu—represents the total all AMP CPU time for the specific plan.

Rgcpu—represents the total all AMP CPU time for the generic plan.

PerAMPRgcpu represents the per single AMP CPU time for the generic plan.

TacticalResp1—The value of per-AMP run-time CPU cost in seconds that determines whether a query is a tactical query or a strategic complex query.

TacticalResp2—The value of per-AMP run-time CPU cost in seconds that determines a tactical query when it is submitted as 'HPriority' request.

HighParsingPTThreshold (or HPPTT in FIG. 8)—Threshold Percentage of parsing cost when compared to the run time CPU cost based on which a determination is made on whether the request has high parsing cost.

HighParsingRTThreshold (or HPRTT in FIG. 8)—Threshold multiplication factor for the determination of run time benefits for a query that has high parsing cost. The run-time CPU costs of specific and generic plans should differ at least by this value multiplied to the specific parsing CPU cost if the request has a high parsing cost.

LowParsingRTThreshold (or LPRTT in FIG. 8)—Threshold factor for the determination of run time benefits for a query that has low parsing cost. The run-time CPU costs of specific and generic plans should differ at least by this value multiplied to the specific parsing CPU cost if the request has a low parsing cost.

UseHiPriority—A flag that enables/disables the HiPriority based decisions in the caching algorithm.

ElapsedTimeThreshold (or ETT in FIG. 8)—Threshold multiplication factor by which the elapsed time of specific plan execution (both parsing and run-time) should be better when compared to the elapsed time in the AMP for the generic plan execution.

EstimateCostFilter—This is used for comparison of estimated costs. This is a threshold factor by which the estimated cost of a specific plan should be better than the estimated cost of a generic plan.

CompareEstimates—A flag that enables/disables the estimate based comparisons for deciding between generic and specific plan execution. This flag is disabled by default. In case a bad generic plan is executed second time and it needs to be tuned, this flag should be used.

```
If request is seen first time
{
    Generate (and estimate the cost of) a specific plan,
    Save Estimate of Specific Plan cost
    Execute specific plan
    Capture Pset, Rset, Pscpu, and Rscpu
}
If request is seen second time
{
    If Pscpu is a small fraction of Rscpu
    {
```

-continued

```
      Mark cache entry as SpecificAlways
      Generate specific plan and execute
   }
   Else
   {
      Generate a generic plan
      If (CompareEstimates flag is set &&
      Estimate of Generic Plan cost > n * Estimate of
      Specific Plan cost)
      /* n will be based on a value, EstimateCostFilter,
      defined in cost profile and computed depending on the
      comparison of parsing and execution of specific plan
      */
      {
         Mark cache entry as SpecificAlways and reoptimize
         as specific
      }
      Else
      {
         Execute generic plan
         Capture Rget, Rgcpu, and PerAMPRgcpu
      }
   }
}
At the end of execution if cache entry is not marked as
SpecificAlways
{
   if (request is HiPriority && UseHiPriority flag is set
   && (Pset + Rset) > ElapsedTimeThreshold * Rget)
   {
      Use the cached generic plan always for subsequent
      requests;
   }
   else
   if ( PerAMPRgcpu <= TacticalResp1 /* tactical */ | |
   (HiPriority && UseHiPriority && (PerAMPRgcpu <=
   TacticalResp2))
   {
      Use the cached generic plan always for subsequent
      requests;
   }
   else
   {
      if(Pscpu > HighParsingPTThreshold * (Rscpu + Pscpu))
      {
         if ((Rgcpu − Rscpu) >= HighParsingRTThreshold * Pscpu)
         {
            Generate specific plan always subsequently;
         }
         else
         {
            Use the cached generic plan always subsequently;
         }
      }
      else
         if ((Rgcpu − Rscpu) >=LowParsingRTThreshold * Pscpu)
         {
            Generate specific plan always subsequently;
         }
   }
   else
   {
      Use the cached generic plan always subsequently;
   }
}
```

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   receiving a plurality of instances of a request to a database system, all instances of the request having a same set of variables to use in executing the request, the values of the variables being supplied by data in a data source;
   generating a specific plan for executing one instance of the request, wherein generating the specific plan comprises taking into account data in the data source;
   executing the specific plan on the database system;
   capturing and saving a system run-time metric and a parsing time for executing the specific plan; and
   deciding to generate and cache a generic plan for executing the plurality of instances of the request to the database system based on a comparison of the system run-time metric and the parsing time for executing the specific plan, wherein the generic plan does not take into account the data in the data source that is taken into account in the specific plan.

2. The method of claim 1, the method further comprising:
   using the cached generic plan to execute instances of the request received after the generic plan is cached.

3. The method of claim 1 wherein:
   the plurality of instances of the request comprises:
      a first instance, which is the first in time of the instances to be received by the database system;
      a second instance, which is the second in time of the instances to be received by the database system; and
   deciding occurs after receipt of the first instance of the request and before receipt of the second instance of the request.

4. The method of claim 3 wherein the specific plan was generated for the first instance of the request and wherein deciding comprises:
   determining that the parsing time for executing the specific plan is not a determined fraction of the system run-time metric for executing the specific plan and, in response:
   generating a generic plan for executing the second instance of the request and estimating a system run-time metric for executing the generic plan, wherein generating the generic plan comprises not taking into account data in the data source; and
   determining that the estimate of the system run-time metric for executing the generic plan is not greater to a determined extent than the estimate of the system run-time metric for executing the specific plan and, in response:
   executing the generic plan.

5. The method of claim 1 wherein:
   the plurality of instances of the request comprises:
      a first instance, which is the first in time of the instances to be received by the database system;
      a second instance, which is the second in time of the instances to be received by the database system;
      a third instance, which is the third in time of the instances to be received by the database system; and
   deciding occurs after receipt of the second instance of the request.

6. The method of claim 5 wherein the specific plan was generated for the first instance of the request and wherein deciding comprises:
   generating a generic plan for executing the second instance of the request;
   executing the generic plan on the database system;
   capturing and saving a system run-time metric and a parsing time for executing the generic plan; and
   basing the decision to cache the generic plan on a comparison of a fraction of the parsing cost to the difference between the system run-time metric for executing the generic plan and the system run-time metric for executing the specific plan.

7. The method of claim 1 wherein deciding comprises:
determining that an instance of the request is a special request selected from the group consisting of a high priority request, a tactical request, a request comprising a temporal element, and a request that will invoke a single computer out of a plurality of computer running the database system.

8. A computer program, stored in a non-transitory tangible medium, the program comprising executable instructions that cause a computer to:
receive a plurality of instances of a request to a database system, all instances of the request having a same set of variables to use in executing the request, the values of the variables being supplied by data in a data source;
generate a specific plan for executing one instance of the request, wherein when generating the specific plan the computer takes into account data in the data source;
execute the specific plan on the database system;
capture and save a system run-time metric and a parsing time for executing the specific plan; and
decide to generate and cache a generic plan based on a comparison of the system run-time metric and the parsing time for executing the specific plan.

9. The computer program of claim 8, the computer program further comprising executable instructions that cause the computer to:
use the cached generic plan to execute instances of the request received after the generic plan is cached.

10. The computer program of claim 8 wherein:
the plurality of instances of the request comprises:
a first instance, which is the first in time of the instances to be received by the database system;
a second instance, which is the second in time of the instances to be received by the database system; and
the computer decides to generate and cache the generic request after receipt of the first instance of the request and before receipt of the second instance of the request.

11. The computer program of claim 10 wherein the specific plan was generated for the first instance of the request and wherein when deciding the computer:
determines that the parsing time for executing the specific plan is not a determined fraction of the system run-time metric for executing the specific plan and, in response:
generates a generic plan for executing the second instance of the request and estimates a system run-time metric for executing the generic plan, wherein when generating the generic plan the computer does not take into account data in the data source; and
determines that the estimate of the system run-time metric for executing the generic plan is not greater to a determined extent than the estimate of the system run-time metric for executing the specific plan and, in response:
executes the generic plan.

12. The computer program of claim 8 wherein:
the plurality of instances of the request comprises:
a first instance, which is the first in time of the instances to be received by the database system;
a second instance, which is the second in time of the instances to be received by the database system;
a third instance, which is the third in time of the instances to be received by the database system; and
the computer decides to generate and cache the generic plan after receipt of the second instance of the request.

13. The computer program of claim 12 wherein the specific plan was generated for the first instance of the request and wherein when deciding the computer:
generates a generic plan for executing the second instance of the request;
executes the generic plan on the database system;
captures and saves a system run-time metric and a parsing time for executing the generic plan; and
bases the decision to cache the generic plan on a comparison of a fraction of the parsing cost to the difference between the system run-time metric for executing the generic plan and the system run-time metric for executing the specific plan.

14. The computer program of claim 8 wherein deciding comprises:
determining that an instance of the request is a special request selected from the group consisting of a high priority request, a tactical request, a request comprising a temporal element, and a request that will invoke a single computer out of a plurality of computer running the database system.

15. A database system, the system comprising:
one or more nodes;
a plurality of CPUs, each of the one or more nodes providing access to one or more CPUs;
a plurality of virtual processes, each of the one or more CPUs providing access to one or more virtual processes;
each virtual process configured to manage data, including rows from the set of database table rows, stored in one of a plurality of data-storage facilities;
a program configured to:
receive a plurality of instances of a request to a database system, all instances of the request having a same set of variables to use in executing the request, the values of the variables being supplied by data in a data source;
generate a specific plan for executing one instance of the request, wherein when generating the specific plan the computer takes into account data in the data source;
execute the specific plan on the database system;
capture and save a system run-time metric and a parsing time for executing the specific plan; and
decide to generate and cache a generic plan based on a comparison of the system run-time metric and the parsing time for executing the specific plan.

16. The database system of claim 15, the program being further configured to:
use the cached generic plan to execute instances of the request received after the generic plan is cached.

17. The database system of claim 15 wherein:
the plurality of instances of the request comprises:
a first instance, which is the first in time of the instances to be received by the database system;
a second instance, which is the second in time of the instances to be received by the database system; and
the computer decides to generate and cache the generic request after receipt of the first instance of the request and before receipt of the second instance of the request.

18. The database system of claim 17 wherein the specific plan was generated for the first instance of the request and wherein the program is further configured to:
determine that the parsing time for executing the specific plan is not a determined fraction of the system run-time metric for executing the specific plan and, in response:
generate a generic plan for executing the second instance of the request and estimate a system run-time metric for executing the generic plan, wherein when generating the generic plan the computer does not take into account data in the data source; and determine that the estimate of the system run-time metric for executing the generic plan is not greater to a determined extent than the estimate of the system run-time metric for executing the specific plan and, in response:

execute the generic plan.

19. The database system of claim 15 wherein:
the plurality of instances of the request comprises:
- a first instance, which is the first in time of the instances to be received by the database system;
- a second instance, which is the second in time of the instances to be received by the database system;
- a third instance, which is the third in time of the instances to be received by the database system; and the program decides to generate and cache the generic plan after receipt of the second instance of the request.

20. The database system of claim 19 wherein the specific plan was generated for the first instance of the request and wherein when deciding the program:
- generates a generic plan for executing the second instance of the request;
- executes the generic plan on the database system;
- captures and saves a system run-time metric and a parsing time for executing the generic plan; and
- bases the decision to cache the generic plan on a comparison of a fraction of the parsing cost to the difference between the system run-time metric for executing the generic plan and the system run-time metric for executing the specific plan.

* * * * *